Aug. 11, 1925.

F. K. KNILL 1,549,121

FISHING SINKER

Filed July 3, 1924

INVENTOR
Frank K. Knill

By Bates Macklin Goldrick & Peare
ATTORNEYS

Patented Aug. 11, 1925.

1,549,121

UNITED STATES PATENT OFFICE.

FRANK K. KNILL, OF VERMILION, OHIO.

FISHING SINKER.

Application filed July 3, 1924. Serial No. 723,910.

*To all whom it may concern:*

Be it known that I, FRANK K. KNILL, a citizen of the United States, residing at Vermilion, in the county of Erie and State of Ohio, have invented a certain new and useful Improvement in a Fishing Sinker, of which the following is a full, clear, and exact description, reference being had to the accompanying drawings.

This invention relates to sinkers adapted for use with fishing tackle and refers particularly to a sinker which is provided with separable sections whereby the effective weight of the sinker may be selectively controlled.

Separable sinkers heretofore made have embodied a plurality of sections having a threaded connection therebetween. The principal objection to a sinker of this character is not only the difficulty of providing a threaded connection which will not be impaired by the corrosive action of the elements, but also the difficulty of maintaining a satisfactory connection between the component parts when the sinker is in use. Moreover sinkers of this type usually must be hung upon one of the links in the chain to which the bait is attached, but this is apt to interfere with the normal action of the bait in the water when used for trolling or casting purposes.

The principle of my invention, therefore, is the provision of a separable sinker which overcomes the above objection. To this end I provide a plurality of separable sections which are so formed as to cooperate with the swivel link in a chain whereby they form in effect part of the link and thereby permit use of the sinker without impairing the normal action of the bait in the water. The preferred manner of connecting the sections together as well as to the links in the chain, is hereinafter fully set forth in the following description and is illustrated in the accompanying drawings. The essential features of my invention are summarized in the claims.

Figure 2:
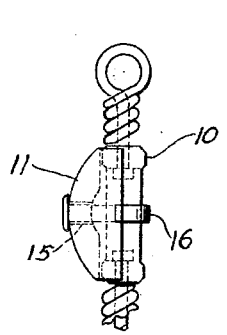
Figure 1:
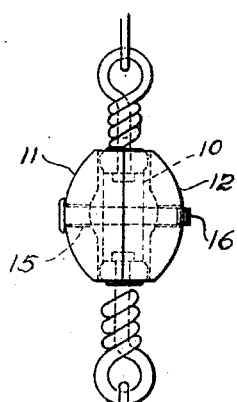
Figure 3:
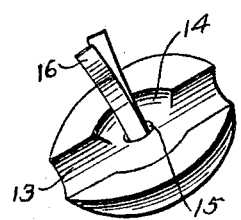

In the drawings, Fig. 1 is a side elevation of a chain swivel embodying a sinker illustrating my invention; Fig. 2 is a side elevation of the sinker shown in Fig. 1 with a portion thereof removed; and Fig. 3 is a perspective view of a part of the sinker.

I have illustrated my invention in connection with a swivel 10 which forms part of a link in the chain and which is customarily used for trolling or casting purposes. The sinker in the preferred form comprises separable sections 11 and 12, each of which has a recess 13 extending longitudinally and adjacent the inner side thereof, with an enlarged recess 14 adjacent the mid portion thereof, and an opening 15 extending transversely therethrough. The outer surface of each section is rounded, while the inner surface comprises a plane surface, whereby the cooperating meeting faces of the respective sections coact to provide a substantially unitary structure when the sections are brought together.

The preferred manner of securing the sections to each other and to the swivel, embodies a cotter pin 16 which passes through openings in the swivel and sections respectively and is fastened in the conventional manner. An advantage of this connection is that one section may be removed as shown in Fig. 2, whereupon the sides of the pin may be extended around the swivel to maintain the remaining section in close fitting engagement therewith.

The particular advantage of a sinker made in accordance with my invention is the facility for selectively adjusting the weight of the sinker in accordance with the bait to be used, without necessitating any disengagement of the cooperating links, and without necessitating removal of the bait. Moreover, the fact that the sections are attached directly to the swivel functions to prevent the sinker from swinging laterally and thereby creating a disturbance in the water, which detracts from the bait.

Having thus described my invention, I claim:

1. A separable sinker comprising in combination a plurality of cooperating sections having aligned openings therein and having cooperating recesses adapted, when joined, to provide a chamber, a swivel occupying said chamber and having an opening in alignment with the openings in the sections, and a securing member extending through all of said openings for locking the sections to each other.

2. A separable sinker comprising a pair of cooperating members, each having recesses therein, said recesses cooperating to provide a chamber when the sections are brought into cooperating relationship with each other, said chamber being adapted to surround a portion of a chain, and a removable member extending through the sections for locking them either individually or collectively to said chain.

In testimony whereof, I hereunto affix my signature.

FRANK K. KNILL.